US006976206B2

(12) United States Patent
Haulk et al.

(10) Patent No.: US 6,976,206 B2
(45) Date of Patent: *Dec. 13, 2005

(54) METHODS AND APPARATUS FOR INTELLIGENT DATA BEDCHECK OF AN ELECTRONIC SHELF LABEL

(75) Inventors: Kevin W. Haulk, Griffin, GA (US); Cheryl K. Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 731 days.

This patent is subject to a terminal disclaimer.

(21) Appl. No.: 10/044,610

(22) Filed: Jan. 11, 2002

(65) Prior Publication Data

US 2003/0135416 A1 Jul. 17, 2003

(51) Int. Cl.[7] ................................................ G06F 7/02
(52) U.S. Cl. ....................................................... 714/821
(58) Field of Search ............................... 714/821, 748, 714/749

(56) References Cited

U.S. PATENT DOCUMENTS 5,604,923 A * 2/1997 Wilkus ..................... 455/67.7
5,704,049 A * 12/1997 Briechle .................... 715/744

* cited by examiner

Primary Examiner—Richard Chilcot
(74) Attorney, Agent, or Firm—Priest & Goldstein, PLLC

(57) ABSTRACT

An electronic price label (ESL) system providing an intelligent data bedcheck of an ESL. In one aspect, the ESL includes a plurality of registers for storing information controlling the content and formatting of the information displayed. A host computer system includes an ESL data file comprising a data image of the ESL's registers. To perform an intelligent data bedcheck of an ESL, the host computer determines the portions of the ESL's registers which are currently used to control the display of information by the ESL. The host computer then calculates one or more sumchecks of the data which is stored in the determined registers, and transmits one or more bedcheck messages including the sumchecks to the ESL. The ESL receives each bedcheck message and compares each received sumcheck with a sumcheck calculated using the information stored in the ESL's registers which are associated with each sumcheck. For each received sumcheck, if the received sumcheck matches the sumcheck calculated using the information stored in the ESL's registers, the ESL transmits a positive acknowledgement message to the host computer. If the received sumcheck does not match the sumcheck calculated using the information stored in the plurality of registers, the ESL transmits a negative acknowledgment message to the host computer, and the host computer then transmits one or more messages to the ESL updating the registers associated with the failed bedcheck with the data contained in the ESL data file.

11 Claims, 4 Drawing Sheets

FIG. 3

| REG. NO. | REGISTER DATA | SEQUENCE REG. 1 | SEQUENCE REG. 2 | SEQUENCE REG. 3 | SEQUENCE REG. 4 | GROUP MASK |
|---|---|---|---|---|---|---|
| 1 | 2.50 .67 | 10 | 0 | 0 | 0 | 1 |
| 2 | 1.99 .50 | 0 | 10 | 0 | 0 | 1 |
| 3 | | 0 | 0 | 0 | 0 | 1 |
| 4 | | 0 | 0 | 0 | 0 | 1 |
| 5 | YOU SAVE | 0 | 5 | 0 | 0 | 1 |
| 6 | 0.51 | 0 | 5 | 0 | 0 | 1 |
| 7 | WITH CARD | 0 | 5 | 0 | 0 | 1 |
| 8 | BUY TODAY | 3 | 0 | 0 | 0 | 1 |
| 9 | | 0 | 0 | 0 | 0 | 1 |
| 10 | | 0 | 0 | 0 | 0 | 0 |
| 11 | | 0 | 0 | 0 | 0 | 1 |
| 12 | | 0 | 0 | 0 | 0 | 1 |
| 13 | | 0 | 0 | 0 | 0 | 0 |
| 14 | STOCK 153 | 0 | 0 | 255 | 6 | 1 |
| 15 | BIB TODAY | 0 | 0 | 0 | 6 | 1 |
| 16 | UPDATING | 0 | 0 | 0 | 0 | 1 |

| CURRENT ACTIVE SEQUENCE | CURRENT BUTTON SEQUENCE |
|---|---|
| 1 | 4 |

| BUTTON ENABLED |
|---|
| 1 |

| GROUP REGISTER | ID |
|---|---|
| 1 | 15 |
| 2 | 25 |
| 3 | 101 |
| 4 | 500 |

| SCHEDULED SEQUENCE NUMBER | SCHEDULED SEQUENCE ENABLED | SCHEDULED SEQUENCE TIME | SCHEDULED SEQUENCE | SCHEDULED SEQUENCE DISPLAY |
|---|---|---|---|---|
| 1 | 1 | 2001-08-31  15:00:00 | 2 | 1 |
| 2 | 0 | -- | -- | -- |
| 3 | 1 | 2001-08-30  23:00:00 | 4 | 0 |
| 4 | 0 | -- | -- | -- |

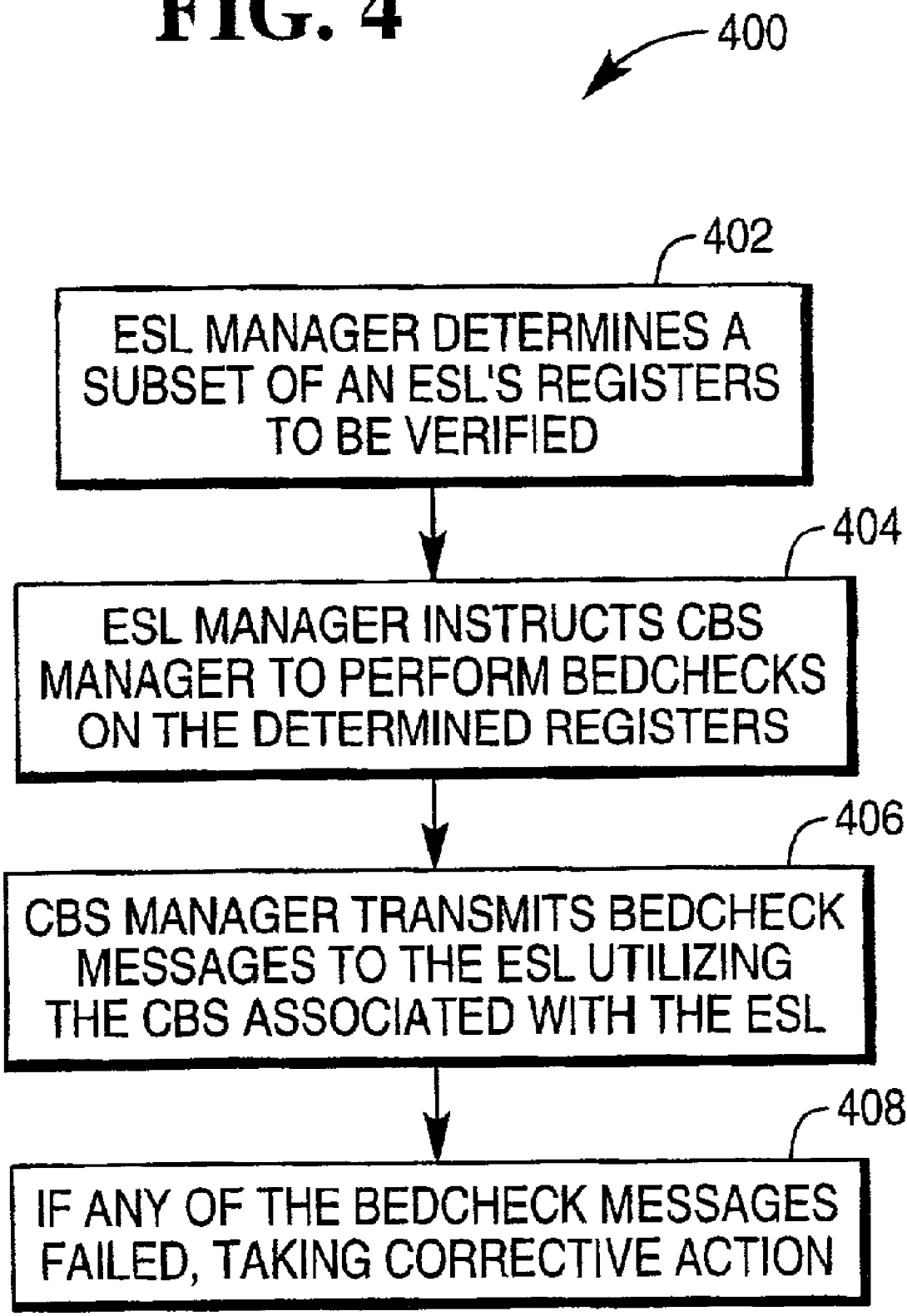

METHODS AND APPARATUS FOR INTELLIGENT DATA BEDCHECK OF AN ELECTRONIC SHELF LABEL

FIELD OF THE INVENTION

The present invention relates generally to improvements in electronic shelf label (ESL) systems used in transaction establishments. More specifically, the present invention relates to improved for performing an intelligent data bedcheck of an ESL.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including register update messages, to the ESLs.

While prior ESL systems provide many of the capabilities required by retailers, these systems may suffer from various disadvantages. For example, a full data bedcheck to determine if all of an ESL's registers contain the correct information typically requires a large number of messages to be transmitted to the ESL. Such a full data bedcheck of all of the ESL's registers can take a significant amount of time to transmit and process, impacting overall system performance when a large number of ESLs are being verified. Therefore, it would be desirable to provide an ESL system and method that provides for an intelligent bedcheck which verifies only a portion of the ESL's registers which are currently used to control the display of information by the ESL.

SUMMARY OF THE INVENTION

The present invention advantageously provides methods and apparatus for an improved electronic shelf label (ESL) system. In one aspect, the present invention includes an ESL for displaying information relating to an item associated with the ESL. The ESL includes a plurality of registers for storing information controlling the content and formatting of the information displayed. A host computer system includes an ESL data file comprising a data image of the ESL's registers or memory. To perform an intelligent data bedcheck of an ESL, the host computer determines the portions of the ESL's registers which are currently used to control the display of information by the ESL on the ESL's display. The host computer then calculates one or more sumchecks of the data which is stored in the determined registers, and transmits one or more bedcheck messages including the sumchecks to the ESL. The ESL receives each bedcheck message and compares each received sumcheck with a sumcheck calculated using the information stored in the ESL's registers which are associated with each sumcheck. For each received sumcheck, if the received sumcheck matches the sumcheck calculated using the information stored in the ESL's registers, the ESL transmits a positive acknowledgement message to the host computer. If the received sumcheck does not match the sumcheck calculated using the information stored in the plurality of registers, the ESL transmits a negative acknowledgment message to the host computer, and the host computer then transmits one or more messages to the ESL updating the registers associated with the failed bedcheck with the data contained in the ESL data file.

A more complete understanding of the present invention, as well as further features and advantages of the invention, will be apparent from the following detailed description and the accompanying drawings.

BRIEF DESCRIPTION OF THE DRAWINGS

FIG. 3 shows an exemplary ESL register map in accordance with the present invention; and FIG. 4 shows a method of performing an intelligent data bedcheck in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044,021 filed Jan. 11, 2002 entitled "Methods and Apparatus for Performing Delta Updates of an Electronic Shelf Label", U.S. patent application Ser. No. 10/044,020 filed Jan. 11, 2002 entitled "Methods and Apparatus for Reduced Electronic Shelf Label Power Consumption"now U.S. Pat. No. 6,626,359, U.S. patent application Ser. No. 10/044,535 filed Jan. 11, 2002 entitled "Methods and Apparatus for Error Detection and Correction of an Electronic Shelf Label System Communication Error", U.S. patent application Ser. No. 10/044,439 filed Jan. 11, 2002 entitled "Methods and Apparatus for Automatically Locating an Electronic Shelf Label", U.S. patent application Ser. No. 10/044,440 filed Jan. 11, 2002 entitled "Methods and Apparatus for Conserving Battery Power in an Electronic Shelf Label System", U.S. patent application Ser. No. 10/044,688 Jan. 11, 2002 entitled "Methods and Apparatus for Automatic Assignment of a Communication Base Station and Timeslot for an Electronic Shelf Label", U.S. patent application Ser. No. 10/044,687 filed Jan. 11, 2002 entitled "Methods and Apparatus for Error Detection and Correction in an Electronic Shelf Label System", all of which are assigned to the assignee of the present invention and incorporated by reference herein in their entirety.

Figure 1:
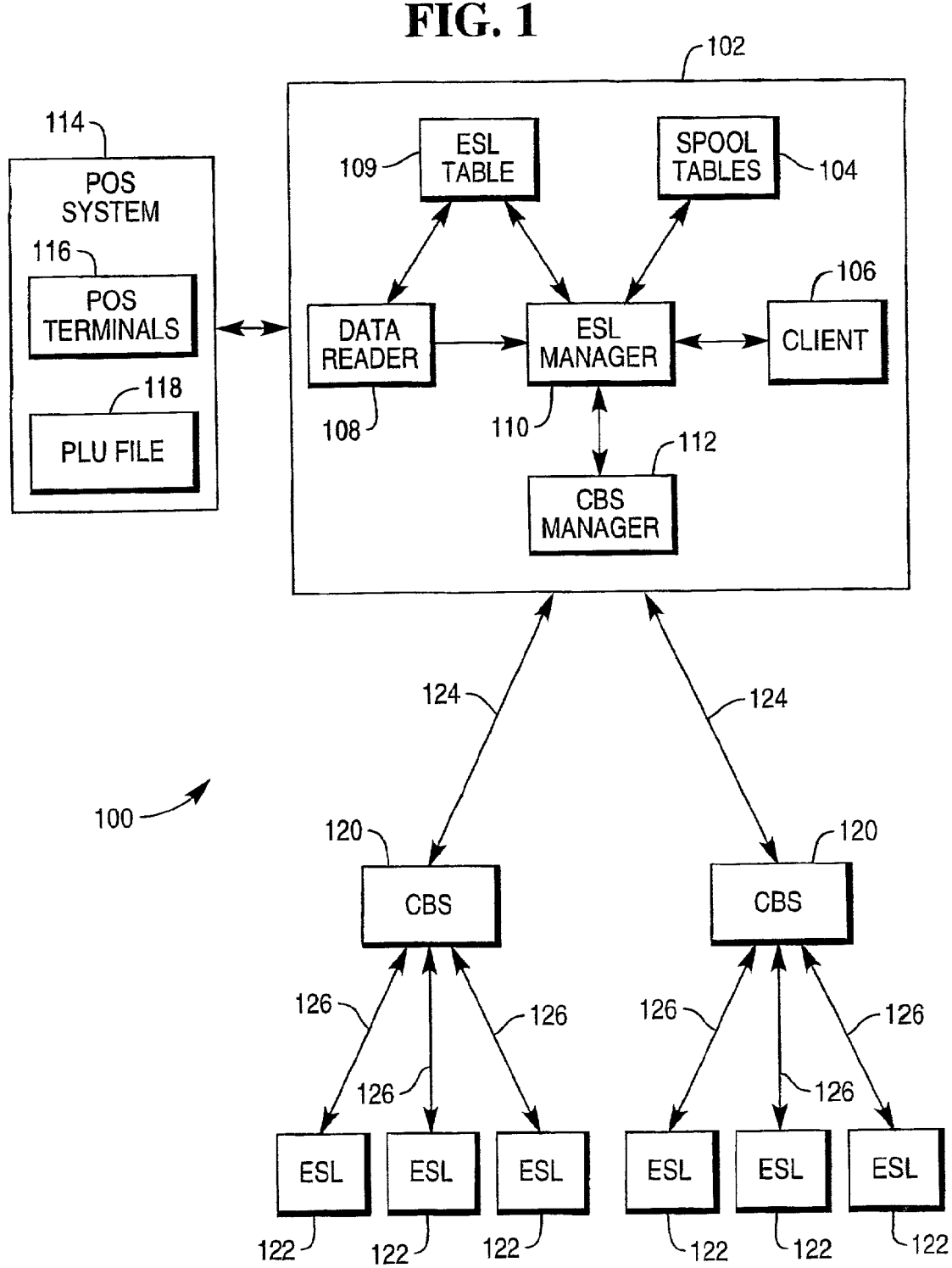
FIG. 1 shows a block diagram of a transaction management system in accordance with the present invention.

FIG. 1 shows a transaction management system 100 in accordance with the present invention. The system 100 includes an ESL computer system 102 and a point-of-sale (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client application 106 and a communication base station (CBS)

manager 112. POS system 114 includes a price look-up (PLU) file 118 and POS terminals 116.

The system 100 also includes CBSs 120 and ESLs 122. The CBSs 120 may be suitably mounted in or near the ceiling of the retail establishment. ESLs 122 are typically attached to store shelving adjacent to items. In one aspect, the system 100 includes a plurality of groups of ESLs 122 and a plurality of CBSs 120, with each group of ESLs 122 assigned to one of the CBSs 120. A record of this assignment relationship is stored in system memory, for example, as part of the data stored in the ESL data file 109.

The ESL manager 110 records and schedules messages to the ESLs 122. The ESL manager 110 monitors and maintains an action list for the ESLs 122 utilizing spool tables 104, and provides a scheduling function for time related events which need to occur at a future point in time. Items on the action list may be provided from client components as requests for work, may be automatically generated by the ESL manager 110, or could be due to requests that required additional processing at a later date, such as, for example, a series of sale prices to be represented at the ESLs at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, and the like. Based on the response returned from the ESL 122 via the CBS Manager 120, the ESL Manager 112 then updates the ESL table 109 and spool tables 104 as appropriate. Such updates may include marking a particular task as completed, updating the data image of the ESL 122, and the like. A client application, such as client application 106, may interface with the ESL manager 110 to initiate requests for a particular activity. The data reader 108 provides an interface from the ESL manager 110 to the POS system 114.

The CBS manager 112 is responsible for all communications, processing, and monitoring of the CBSs. The CBS manager 112 receives information intended to be transmitted to the ESLs 122 and processes it into a form appropriate for use by the CBSs 120 and ESLs 122. The CBS manager 112 processes the response of a particular ESL 122 after a CBS 120 has received that response and then passed that response to the CBS manager 112. Additionally, the CBS manager 112 monitors the CBSs 120 for problems, performs diagnostics on the CBSs 120 and logs errors.

The messages are sent to the CBSs 120 through communication links 124. The communication links 124 may suitably utilize radio frequency (RF) communication, infrared (IR) communication, a wired link, or some combination of communication techniques. Groups of ESLs 122 are assigned to a particular CBS for communication. After receiving a message from the host system 102, a particular CBS 120 which has been assigned to an ESL 122 then transmits the message to the ESL 122 utilizing communication link 126, which may suitably utilize RF communication, IR communication, or some combination of communication techniques.

After receiving messages, the ESLs 122 transmit responses to CBSs 120 over communication links 126. The CBSs 120 would processes and retransmits the response messages to the CBS manager 112 over communication links 124. The CBSs 120 may also detect the signal strength of the responses and report the signal strengths to the host computer system 102.

The ESL data file 109 consists of multiple records, with each record corresponding to a particular ESL 122 in a retail establishment. The record for each ESL 122 includes a number of fields, with each field containing the data which is supposed or assumed to be in one of the registers of the ESL 122. Thus, the record contains a picture, or full data image, of what data is intended to be stored in the ESL 122, and consequently, what the ESL 122 should be displaying on the ESL's display. Additionally, each record may include a variety of additional non-display information related to the ESL 122, such as the timeslot the ESL 122 listens on, the CBS 120 assigned to the ESL 122, and the PLU number of the item associated with the ESL 122. The record may also contain diagnostic and tally information related to that ESL 122, such as when the last time a message was sent to the ESL 122, the last time the ESL 122 had a data bedcheck, a count of how many times the ESL 122 has failed its data bedcheck, and the like.

Figure 2:
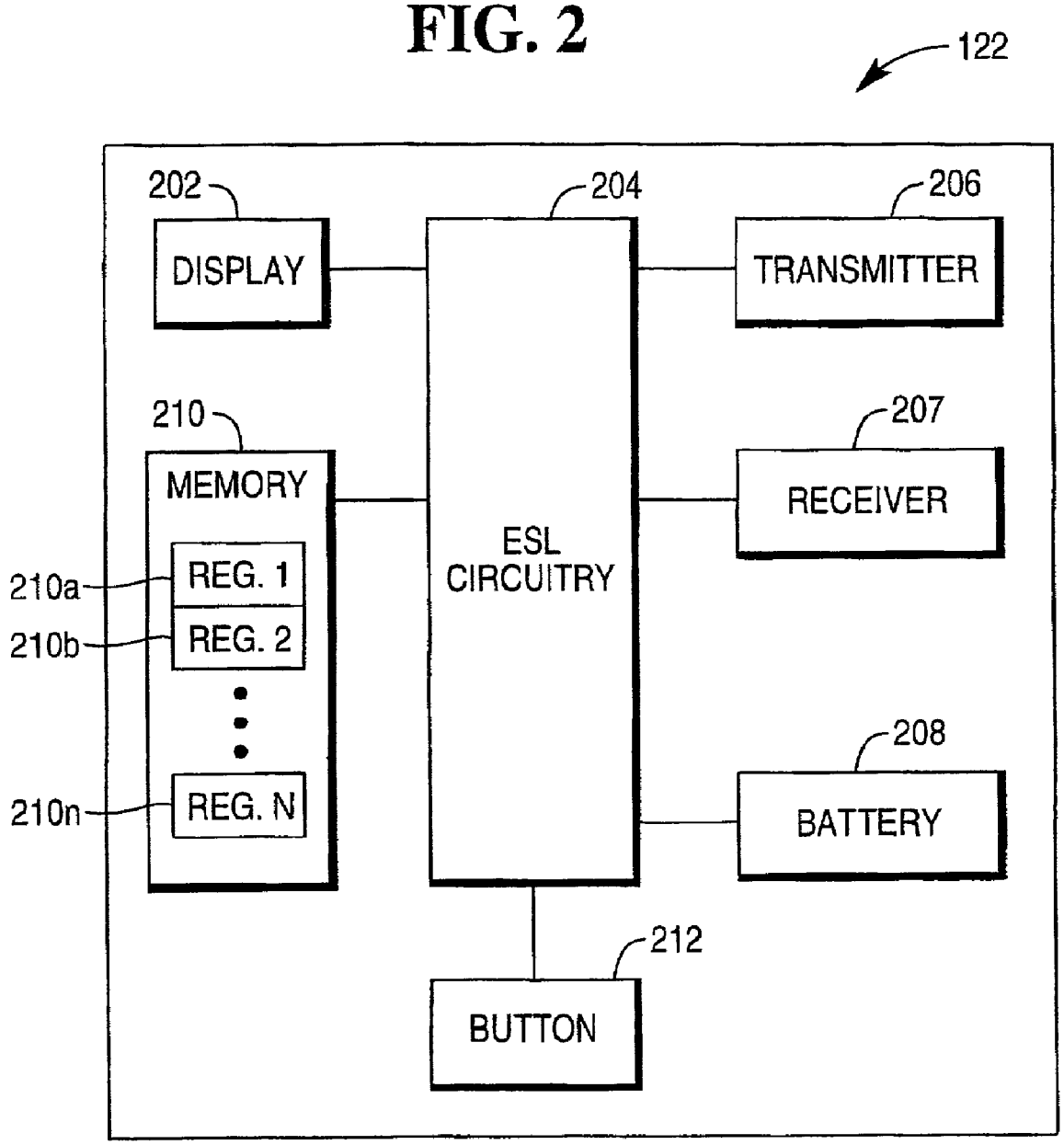
FIG. 2 is a block diagram of an ESL in accordance with the present invention.

FIG. 2 shows a block diagram of an exemplary ESL 122 in accordance with the present invention. A display 202 displays information, such as item price and related data. ESL 122 includes a transmitter 206 for transmitting messages and a receiver 207 for receiving messages. The transmitter 206 and receiver 207 may utilize RF communication, IR communication, a wired link or some combination of communication techniques. A battery 208 provides power for the operation of ESL 122. The operation of ESL 122 is controlled by ESL circuitry 204. ESL circuitry 204 decodes incoming messages received, and performs any actions indicated by the messages. For example, if a register update message is received, the ESL circuitry 204 would cause the appropriate register to be updated with the data. ESL memory 210 includes a plurality of registers, or memory locations, such as registers $210a, 210b, \ldots, 210n$. The ESL memory 210 may contain many types of information. For example, the memory 210 may include display registers which contain the actual text to be displayed by the ESL 122. This text may include item price, informative or promotional text, text directed to store employees, and the like. Other registers may contain data which controls various parameters related to the display of the text, such as display register selection and timing sequences, for example. The ESL 122 may also include a button 212 which may be depressed to initiate a particular function, such as, for example, the display of an alternate message.

As described above, each ESL 122 is associated with a particular CBS 120 which transmits messages to the ESL 122 and listens for responses. Each CBS 120 in a retail establishment transmits messages to and receives responses from groups of ESLs 122 assigned to the particular CBS 120. In a preferred embodiment, communication between the CBSs 120 and the ESLs 122 is divided into frames, with each frame being 1.45 seconds. Each frame is further divided into 24 timeslots, with each timeslot being 60.42 milliseconds. In addition to being associated with a particular CBS 120, each ESL 122 is associated with a particular timeslot and listens for messages and transmits responses during that timeslot only. Each CBS 120 may suitably support two timeslots for the transmission and reception of messages during normal operation.

FIG. 3 shows an exemplary ESL register map 300 of the registers of an ESL 122 in accordance with the present invention. The ESL 122 may include sixteen display registers $302_1, 302_2, \ldots, 302_{16}$ which contain the text or information to be displayed by the ESL 122. This display data may include a price or prices, some information text or promotional text, and possibly some text for in-store use, such as when to stock, what product to stock, and the like. The registers 302 may also store text that is not actually being displayed at any given time. How the text is displayed is controlled by other registers, as described in greater detail below.

The ESL 122 may also include four sequence registers 304, 306, 308, 310, with each sequence register storing sixteen numbers. The stored sixteen numbers in each sequence register correspond to the sixteen data registers. Each of the sixteen numbers may range from 0–255 and indicates how long the text in the corresponding register is to be displayed. A zero in one of the slots in the sequence register indicates that the corresponding text does not display. A 255 in the slot indicates that the text should display for 59.7 seconds, or approximately 1 minute. Numbers in between 0–255 indicate proportional times between 0 and 1 minute. Thus, as seen in the example shown in FIG. 3, the first sequence register 304 forces the contents of the first display register $302_1$ to display for 10 cycles, or about 2.3 seconds, and the contents of the eighth display register $302_8$ to display for 3 cycles, or about 0.7 seconds, with the contents of the remaining display registers 302 not being displayed. Thus, the ESL 122 displays "2.50 0.67" for about 2.3 seconds and then displays "BUY TODAY" for about 0.7 seconds. This cycle between the first display register $302_1$ and the eighth display register $302_8$ repeats, encouraging the customer to purchase the product, and informing the customer that the total cost of the item is $2.50 and that the unit price is $ 0.67.

At any particular time, a current active sequence register 312 indicates which one of the four sequence registers controls the text displayed by the ESL 122. In the example shown in FIG. 3, the current active sequence register 312 contains a "1", indicating that the first sequence register 304 will be utilized, and information will be displayed as detailed above. If a message transmitted to the ESL 122 writes the current active sequence register 312 to "2", then the text displayed will be controlled by the second sequence register 306. The second sequence register 306 will then force the contents of the second display register $302_2$ to display for 10 cycles, or about 2.3 seconds, the contents of the fifth display register $302_5$ to display for 5 cycles, or about 1.17 seconds, the contents of the sixth display register $302_6$ to display for 5 cycles, and the contents of the seventh display register $302_7$ to display for 5 cycles, with the contents of the remaining display registers 302 not being displayed. Thus, the ESL 122 displays "1.99 .50"for about 2.3 seconds, "YOU SAVE" for about 1.17 seconds, "0.51"for 1.17 seconds, and "WITH CARD" for 1.17 seconds, with the cycle repeating. Thus, a customer sees a sequence of "1.99 .50", "YOU SAVE", "0.51" and "WITH CARD", informing the customer that the total cost of the item is $2.50 and the unit price is $ 0.67, and encouraging the customer to save $ 0.51 by using a frequent shopper card to purchase the item.

One embodiment of an ESL 122 may include a button which, when depressed, temporarily changes the currently displayed sequence. The button may be disabled or enabled using the contents of button enabled register 316, with a "1" enabling the button and a "0" disabling the button. If the button is enabled, the current button sequence register 314 determines which sequence register is used to control the display while the button is depressed. In the example shown in FIG. 3, the current button sequence register 314 is loaded with a "4", indicating that the fourth sequence register 310 will control the display of information while the button is depressed.

The ESL 122 may include four group registers 318, 320, 322, 324. Each group register can contain an identification number which allows ESLs 122 to be addressed by the group the ESLs 122 belong to rather than individually. For example, group register 318 may be used to store a department number, such as the dairy department, allowing a single broadcast to affect all the ESLs in the dairy department.

The ESL 122 may also include four scheduled sequence registers 326, 328, 330, 332 which may be used to override the current active sequence. These registers may be loaded in advance and then will be automatically activated at the appropriate time. For example, the first scheduled sequence register 326 is enabled to switch the current active sequence on Aug. 31, 2001 at 3:00 PM (or 15:00:00) to the second sequence register 306 for the current display sequence. Thus, in scheduled sequence register 326, register element 326a is loaded with a "2", indicating the second sequence register 306 should be used for the new sequence, and register element 326b is loaded with a "1", indicating that the sequence affected is the current active sequence. As another example, the scheduled sequence register 330 is enabled to switch the current active sequence on Aug. 30, 2001 at 11:00 PM (or 23:00:00) to the fourth sequence register 310 for the button display sequence. Thus, in scheduled sequence register 330, register element 330a is loaded with a "4", indicating the fourth sequence register 310. Register element 330b is loaded with a "0", indicating that the sequence affected is the button sequence. The scheduled sequence registers 328 and 332 are both disabled in the example shown in FIG. 3.

The ESL 122 further includes a group mask register 334 comprising a series of sixteen bits corresponding to the sixteen registers 302 on the ESL 122. A "1" in the group mask for a particular register indicates that the register 302 should be displayed provided the associated sequence register contains a non-zero number. A "0" in the group mask for a particular register 302 indicates that the register 302 is not displayed even if the associated sequence register has a non-zero number in it. In other words, a "0" in the group mask overrides any setting in a sequence register which indicates that the contents of a register should be displayed.

Occasionally, due to a hardware error, communication error, software malfunction or the like, the memory of an ESL 122 may contain incorrect data which does not match the data contained in the ESL data file 109. This incorrect data may result in the ESL 122 displaying information in an incorrect sequence or simply displaying the wrong information. As described above, a full data bedcheck to determine if all of an ESL's registers contain the correct information typically requires a large number of messages to be transmitted to the ESL. A full data bedcheck might include transmission of one bedcheck message per ESL register in the ESL 122, with each bedcheck command including a sumcheck for one of the ESL's registers. Such a full data bedcheck of all of the ESL's registers can take a significant amount of time to transmit and process, impacting overall system performance, especially if a large number of ESLs need to be bedchecked.

In a preferred embodiment, the present invention provides techniques for an intelligent bedcheck which verifies only a subset of the ESL's registers which are currently used to control the display of information by the ESL. To perform an intelligent bedcheck of an ESL 122, the host computer system 102 first determines which registers of the ESL 122 are currently being used to control the display of information by the ESL 122. In the example shown in FIG. 3, the registers affecting the display of information include the display registers $302_1$, $302_8$, $302_{14}$, $302_{15}$, sequence registers 304, 310, current active sequence register 312, current button sequence register 314, button enabled register 316, the scheduled sequence registers 326, 328, 330, 332, and the group mask register 334. The host system then transmits data bedcheck messages to the ESL 122 to verify the contents of each of the determined registers. Thus, in the example shown in FIG. 3, to perform an intelligent bedcheck of the ESL, the host computer would transmit fourteen data bedcheck messages to the ESL. In contrast to the intelligent bedcheck, a full bedcheck might require 32 bedcheck messages to be transmitted.

In an alternate embodiment, only the register or registers which store the current price for an item may be verified with an intelligent bedcheck. For example, after an ESL 122 has had two registers updated which display the regular price and a promotional price, the intelligent bedcheck may be used to verify only those two registers.

In another embodiment, the host computer 102 may verify all the sequence registers and any display registers associated with the sequence registers, allowing verification of information of information that is not currently displayed, but may be potentially displayed.

In another aspect of the present invention, in order to verify all of the ESLs in a retail establishment, groups of ESLs may subject to intelligent bedchecks in a staggered order to allow for efficient utilization of system bandwidth.

Each data bedcheck message contains a sumcheck or error checking code, such as a cyclical redundancy check (CRC), of the intended contents of one of the ESL's registers. The data bedcheck message requests that the ESL compare the received sumcheck with a sumcheck calculated using the data actually contained in the register the sumcheck is targeting. If the received sumcheck matches the calculated sumcheck, the ESL 122 responds to the data bedcheck message with a positive acknowledgement message (ACK). If the received sumcheck does not match the calculated sumcheck, the ESL 122 responds to the data bedcheck message with a negative acknowledgement message (NACK). An ESL which fails such a bedcheck will have the failing registers rewritten or other corrective action will be taken.

FIG. 4 shows a method 400 for performing an intelligent data bedcheck of an ESL in accordance with the present invention. In step 402, a host computer which includes an ESL manager determines a subset of the ESL's registers to be verified. The subset of the registers controls the information currently displayed by the ESL. In other words, if any of the subset of registers contain incorrect data, the ESL may display incorrect information, or information in an incorrect sequence. In step 404, the ESL manager instructs a CBS manager to perform bedchecks on the subset of registers. In step 406, the CBS manager calculates sumchecks for each of the subset of registers and transmits bedcheck messages to the ESL to verify each of the subset of registers. Each bedcheck message instructs the ESL to compare the calculated sumcheck with a sumcheck based on the actual contents of one of the subset of registers. If the sumchecks match, the ESL responds with an ACK. If the sumchecks do not match, the ESL responds with a NACK. In step 408, if any of the bedcheck messages fail, or if the ESL fails to respond, the host computer may take corrective action, such as sending register update messages to the ESL or logging an error message.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, while a presently preferred embodiment utilizes an ESL to display informational text or price of an associated item, an ESL system may utilize ESLs in a variety of applications and environments without departing from the spirit and scope of the present invention.

We claim:

1. A method of performing an intelligent bedcheck of an electronic shelf label (ESL) comprising the steps of:
   (a) displaying informational text by the ESL, said ESL including a plurality of registers;
   (b) providing an ESL data file stored in a host computer system comprising the intended contents of said plurality of registers;
   (c) determining by the host computer system a subset of said plurality of registers containing both said informational text and data controlling the display of said informational text; and
   (d) verifying that the intended contents of said subset of the registers matches the actual contents of said subset of registers.

2. The method of claim 1 wherein step (d) comprises the substeps of:
   (i) calculating a sumcheck of the intended contents for each of the subset of registers by the host computer; and
   (ii) transmitting bedcheck messages to the ESL by the host computer, each bedcheck message including the calculated sumcheck for one of the subset of registers.

3. The method of claim 2 further comprising the substeps of:
   (iii) receiving each bedcheck message by the ESL;
   (iv) comparing each received sumcheck with a sumcheck calculated using the actual contents of one ESL's registers;
   (v) for each received bedcheck message, transmitting a positive acknowledgement message from the ESL to the host computer, if the received sumcheck matches the sumcheck calculated using the actual contents of the ESL's registers; and
   (vi) for each received bedcheck message, transmitting a negative acknowledgment message to the ESL computer, if the received sumcheck does not match the sumcheck calculated using the actual contents of the ESL's registers.

4. The method of claim 3 further comprising the substep of:
   (vii) transmitting at least one message to the ESL updating the ESL's registers with the data contained in the ESL data file, if a negative acknowledgement is received by the host computer.

5. The method of claim 3 further comprising the substep of:
   (vii) taking corrective action if a negative acknowledgement is received by the host computer, or if no acknowledgement is received.

6. An electronic shelf label (ESL) system comprising:
   an ESL including a plurality of registers and a display displaying informational text; and
   a host computer including an ESL data file comprising the intended contents of said plurality of registers, the host computer determining a subset of said plurality of registers containing both said informational text and data controlling the display of said informational text, said host computer communicating with the ESL to verify that the intended contents of said subset of the registers matches the actual contents of said subset of registers.

7. The ESL system of claim 6 wherein the host computer calculates a sumcheck of the intended contents of each of the subset of registers, and transmits bedcheck messages to the ESL by the host computer, each bedcheck message including the calculated sumcheck for one of the subset of registers.

8. The ESL system of claim 7 wherein the ESL receives each bedcheck message and compares each received sumcheck with a sumcheck calculated using the actual contents of one ESL's registers.

9. The ESL system of claim 8 wherein, for each received bedcheck message, the ESL transmits a positive acknowledgement message from the ESL to the host computer, if the received sumcheck matches the sumcheck calculated using the actual contents of the ESL's registers.

10. The ESL system of claim 9 wherein, for each received bedcheck message, the ESL transmits a negative acknowledgment message to the host computer, if the received sumcheck does not match the sumcheck calculated using the actual contents of the ESL's registers.

11. A method of performing an intelligent bedcheck of an electronic shelf label (ESL) comprising the steps of:

displaying informational text by the ESL, said ESL including a plurality of registers, the plurality of registers having a first portion and a second portion, the first portion currently controlling the display of said informational text, the second portion currently not controlling the display of said informational text;

providing an ESL data file stored in a host computer system comprising the intended content of said plurality of registers;

determining by the host computer system the first portion of registers which are currently being used to control the display of said informational text;

calculating a sumcheck of the intended contents for each of the first portion of registers by the host computer; and transmitting bedcheck messages to the ESL by the host computer, each bedcheck message including the calculated sumcheck for one of the first portion of registers.

\* \* \* \* \*